ated Mar. 21, 1972

3,651,205
THREE STAGE DRAGÉE
Alfred Hunger, Basel, and Guenther Muller, Arlesheim, Switzerland, assignors to Ciba-Geigy Corporation, Ardsley, N.Y.
No Drawing. Filed Oct. 28, 1968, Ser. No. 771,322
Claims priority, application Switzerland, Nov. 2, 1967, 15,344/67
Int. Cl. A61k 19/00, 27/00
U.S. Cl. 424—21    4 Claims

ABSTRACT OF THE DISCLOSURE

A pharmaceutical preparation, in the form of a three-stage dragée, suitable for oral administration containing 4,7-phenanthroline-5,6-quinone together with pancreatin, bromelin, dehydrocholic acid, 5,7-dichloro-8-hydroxyquinoline and a suitable carrier.

The new preparations are particularly suitable for the treatment of digestive disturbance, and troubles, diarrhoses, dyspepsias, obstipations or gastrocardial symptom complex.

SUMMARY OF THE INVENTION

The present invention provides a new pharmaceutical preparation for the treatment of digestive troubles and a method of managing such troubles.

The new preparation is suitable for oral administration and is characterized in that it contains 4,7-phenanthroline-5,6-quinone together with pancreatin, bromelin, dehydrocholic acid and 5,7-dichloro-8-hydroxyquinoline and a pharmaceutical excipient suitable for oral administration.

Pancreatin is a mixture of animal amylase, trypsin, chymotrypsin and lipase.

Bromelin is a mixture of different vegetable proteases isolated from the juice, the fruit and the stalks of pineapple.

The new preparation is particularly suitable for the treatment of:

(a) digestive disturbances and troubles caused by excretory disturbances of the pancreas, chronic strophic gastritis, diminished chewing capacity in old people
(b) diarrhoeas associated with unspecific intestinal infections, or disturbed intestinal flora due to antibiotic medication,
(c) dyspepsias resulting from abnormal putrefaction and fermentation, and
(d) obstipations of various etiologies.

The above-mentioned active substances are contained in the new preparation advantageously in an amount such that it contains for every 10 mg. of 4,7-phenanthroline-5,6-quinone approximately 50–150 mg., especially 70–130 mg. of 5,7-dichloro-8-hydroxyquinoline, about 10–40, especially 20–30 mg. of dehydrochloic acid, about 30–70, especially 40–50 mg. of bromelin and about 100–350, especially 120–180 or 150–250 mg. of pancreatin. Particularly efficient are those preparations which contain for every 10 mg. of 4,7-phenanthroline-5,6-quinone 70 mg. of 5,7-dichloro-8-hydroxyquinoline, 25 mg. of dehydrocholic acid, 50 mg. of bromelin and 200–300, especially 220 mg. of pancreatin.

The unit dose is advantageously chosen so that it contains 10 mg. of 4,7-phenanthrolein-5,6-quinone. The daily dose is advantageously chosen so that the patient ingests 20–80 mg., above all 30–60 mg., of 4,7-phenanthroline-5,6-quinone. This daily dose is advantageously administered in smaller single doses; thus, for example, the patient may be given 3 times daily a dose containing 10 or 20 mg. of 4,7-phenanthroline-5,6-quinone.

Accordingly, the new preparation is in the form suitable for oral administration containing per unit dose 10 mg. of 4,7-phenanthroline-5,6-quinone together with the other active substances, above all in the indicated weight ratio, especially together with 70 mg. or 100 mg. of 5,7-dichloro-8-hydroxyquinoline, 25 mg. of dehydrocholic acid, 50 mg. of bromelin and 150–300 mg., especially 150 or 220 mg. of pancreatin, giving daily 3 x 1 or 2 of these unit doses.

The vehicle or envelope suitable for oral administration may be formed, for example, from sugar, magnesium stearate, higher fatty acids, bolus alba, cellulose powder, starches, polyalkyleneglycols and their esters with higher fatty acids, gelatin, gums, cholesterol and further assistants.

The new preparation is preferably administered in dragée form.

It has further been observed that particularly good therapeutic results are obtained with the new preparation when it is given in the form of a special three-stage dragée which, accordingly, is a special object of this invention. This three-stage dragée is characterized in that it contains the bromelin in the dragée layer which dissolves in the gastric juices, whereas inside the core the 4,7-phenanthroline-5,6-quinone and the 5,7-dichloro-8-hydroxyquinoline and, isolated therefrom, in a core envelope, the pancreatin and dehydrocholic acid are contained, the whole core having an envelope which is resistant to the gastric juices but disintegrates in an alkaline medium.

This arrangement ensures above all the liberation of bromelin whose proteolytic activity leads to optimal protein digestion in the stomach.

After a stomach passage, after the envelope has dissolved, advantageously within 4–6 minutes, the pancreatin and then the dehydrocholic acid are liberated in the alkaline conditions of the duodenum. The fermentative effect of pancreatin considerably promotes the digestion of fats, proteins and carbohydrates. The protein digestion is improved not only directly but also indirectly by induction of the pancreas secretion caused by the protein fission products, the peptones an daminoacids. Dehydrocholic acid promotes the resorption of fats and fat-soluble vitamins, emulsifies the ingested food fats and thereby improves the effect of the lipases and develops a choleretic activity. Furthermore, it has a peristaltic effect upon the intestine.

Finally, in the upper portion of the small intestine 4,7-phenanthroline-5,6-quinone and 5,7-dichloro-8-hydroxyquinoline are liberated and distributed in the small intestine. In conjunction these active substances develop an outstanding effect against pathogenic bacteria, fungi and amoebae without affecting the physiological intestinal flora. Dysbioses in the intestines are controlled and a eubiose is restored. The synergistic effect of pancreatin in conjunction with the two active substances mentioned upon nabnormal putrefaction and fermentation processes in the small intestine is especially valuable.

The three-stage dragée referred to above consists advantageously of a core of so-called core granulate formed from 4,7-phenanthroline-5,6-quinoline and 5,7-dichloro-8-hydroxy-quinoline and an envelope round the core consisting of the so-called envelope granulate containing pancreatin and dehydrochloric acid, and these granulates are pressed in the shape of an envelope tablet following the outline of the dragée. This envelope tablet is then coated with a lacquer that is resistant to the gastric juices and then the dragée coating, which contains the bromelin and is soluble in the gastric juices, is applied. Finally, the dragée is given a sugar coating.

The new pharmaceutical preparation is formulated by the methods usual in the manufacture of pharmaceutical products, for example by suitably working up the active substances in conjunction with a suitable pharmaceutical excipient.

The following non-limiting examples illustrate the invention.

EXAMPLE 1

A dragée is formulated from the following ingredients:

| Active substances: | Mg. per dragée |
|---|---|
| Pancreatin | 150.0 |
| 5,7-dichloro-8-hydroxyquinoline | 100.0 |
| Bromelin | 50.0 |
| Dehydrocholic acid | 25.0 |
| 4,7-phenanthroline-5,6-quinone | 10.0 |
| Assistants: | |
| Sugar | 153.8 |
| Bolus alba | 63.2 |
| Talcum | 57.25 |
| Cellulose powder | 20.0 |
| Cellulose-acetate phthalate | 16.0 |
| Wheat starch | 10.5 |
| Arrowroot | 10.0 |
| Corn starch | 10.0 |
| Stearic acid | 6.0 |
| Cysteine hydrochloride | 5.0 |
| Aerosil, composition | 5.0 |
| Kollidon 25 | 4.13 |
| Diethylphthalate | 4.0 |
| Aerosil, pure | 3.39 |
| Titanium dioxide | 3.39 |
| Gelatina alba | 3.0 |
| Polyethyleneglycol-4000-monostearate | 2.26 |
| Sodium laurylsulphate | 2.05 |
| Food dye | 1.13 |
| Magnesium stearate | 1.0 |
| Carnauba wax | 0.05 |
| | 716.15 |

EXAMPLE 2

A three-stage dragée is prepared in the following manner:

1st step

Envelope tablets are pressed on a special tabletting machine which consist of a core granulated and an envelope granulate, the envelope tablets being shaped to follow the outline of the dragée and containing in the core 10 mg. of 4,7-phenanthroline-5,6-quinone and
100 mg. of 5,7-dichloro-8-hydroxyquinoline and in the envelope
25 mg. of dehydrocholic acid and
150 mg. of pancreatin as active ingredients.

The granulates consist of:

| Core granulate: | Mg. per core |
|---|---|
| 4,7-phenanthroline-5,6-quinone | 10.0 |
| 5,7-dichloro-8-hydroxyquinoline | 100.0 |
| Wheat starch | 15.0 |
| Gelatin | 3.0 |
| Arrowroot | 11.0 |
| Stearic acid | 6.0 |
| Talcum | 5.0 |
| Per core | 150.0 |

| Envelope granulate: | Mg. per envelope |
|---|---|
| Pancreatin | 150.0 |
| Dehydrocholic acid | 25.0 |
| Cellulose powder | 30.0 |
| Cellulose ether | 2.5 |
| Talcum | 3.0 |
| Arrowroot | 51.5 |
| Aerosil | 1.5 |
| Magnesium stearate | 1.5 |
| Per envelope | 265.0 |

The core granulate is granulated with water in the usual manner and then dried.

Principally, the pancreatin granulate is likewise prepared in the usual manner, but care is needed to ensure that during the granulating operation the ferment content does not drop.

2nd step

The envelope tablets shaped to follow the dragée outline, having an average gross weight of 415 mg. per tablet, are coated in the usual manner with a cellulose-acetate phthalate lacquer which is resistant to the gastric juices.

3rd step

The cores coated with the lacquer resistant to the gastric juices are coated with an anhydrous dragée-making suspension which contains the proteolytic ferment bromelin as active ingredient. Of this suspension just so many coats are produced on the core as are needed to give each envelope of the individual dragée core an average content of 50 mg. of bromelin.

COMPOSITION OF THE DRAGÉE-MAKING SUSPENSION

| | Percent |
|---|---|
| Bromelin | 10.0 |
| Cellulose ether | 5.0 |
| Talcum | 7.5 |
| Methanol | 7.5 |
| Methylenechloride | 70.0 |

After having been coated with the bromelin layer the dragées are carefully dried.

4th step

Finally, the dragées are given a sugar coating consisting, as is usual, of sugar syrup or a dragée-making suspension.

EXAMPLE 3

A dragée is formulated from the following ingredients:

| Active substances: | Mg. per dragée |
|---|---|
| Pancreatin | 220.0 |
| 5,7-dichloro-8-hydroxyquinoline | 70.0 |
| Bromelin | 50.0 |
| Dehydrocholic acid | 25.0 |
| 4,7-phenanthroline-5,6-quinone | 10.0 |
| Assistants: | |
| Sugar | 153.8 |
| Bolus alba | 63.2 |
| Talcum | 57.25 |
| Cellulose powder | 20.0 |
| Cellulose-acetate phthalate | 16.0 |
| Wheat starch | 10.5 |
| Arrowroot | 10.0 |
| Cornstarch | 10.0 |
| Stearic acid | 6.0 |
| Cysteine hydrochloride | 5.0 |
| Aerosil, composition | 5.0 |
| Kollidon 25 | 4.13 |
| Diethylphthalate | 4.0 |
| Aerosil, pure | 3.39 |
| Titanium dioxide | 3.39 |
| Gelatine alba | 3.0 |
| Polyethyleneglycol-4000-monostearate | 2.26 |
| Sodium laurylsulphate | 2.05 |
| Food dye | 1.13 |
| Magnesium stearate | 1.0 |
| Carnauba wax | 0.05 |
| | 756.15 |

EXAMPLE 4

A three-stage dragée is prepared in the following manner:

1st step

Envelope tablets are pressed on a special tabletting machine which consist of a core granulate and an envelope granulate, the envelope tablets being shaped to follow the outline of the dragée and containing in the core 10 mg. of 4,7-phenanthroline-5,6-quinone and
100 mg. of 5,7-dichloro-8-hydroxyquinoline and in the envelope
25 mg. of dehydrocholic acid and
150 mg. of pancreatin as active ingredients.

The granulates consist of:

| Core granulate: | Mg. per core |
|---|---|
| 4,7-phenanthroline-5,6-quinone | 10.0 |
| 5,7-dichloro-8-hydroxyquinoline | 70.0 |
| Wheat starch | 15.0 |
| Gelatin | 3.0 |
| Arrowroot | 11.0 |
| Stearic acid | 6.0 |
| Talcum | 5.0 |
| Per core | 120.0 |

| Envelope granulate: | Mg. per envelope |
|---|---|
| Pancreatin | 220.0 |
| Dehydrocholic acid | 25.0 |
| Cellulose powder | 30.0 |
| Cellulose ether | 2.5 |
| Talcum | 3.0 |
| Arrowroot | 51.5 |
| Aerosil | 1.5 |
| Magnesium stearate | 1.5 |
| Per envelope | 335.0 |

The core granulate is granulated with water in the usual manner and then dried.

Principally, the pancreatin granulate is likewise prepared in the usual manner, but care is needed to ensure that during the granulating operation the ferment content does not drop.

2nd step

The envelope tablets shaped to follow the dragée outline, having an average gross weight of 455 mg. per tablet, are coated in the usual manner with a celluloseacetate phthalate lacquer which is resistant to the gastric juices.

3rd step

The cores coated with the lacquer resistant to the gastric juices are coated with an anhydrous dragée-making suspension which contains the proteolytic ferment bromelin as active ingredient. Of this suspension just so many coats are produced on the core as are needed to give each envelope of the individual dragée core an average content of 50 mg. of bromelin.

COMPOSITION OF THE DRAGÉE-MAKING SUSPENSION

| | Percent |
|---|---|
| Bromelin | 10.0 |
| Cellulose ether | 5.0 |
| Talcum | 7.5 |
| Methanol | 7.5 |
| Methylenechloride | 70.0 |

After having been coated with the bromelin layer the dragées are carefully dried.

4th step

Finally, the dragées are given a sugar coating consisting, as is usual, of sugar syrup or a dragée-making suspension.

We claim:

1. A pharmaceutical preparation containing for every 10 mg. of 4,7-phenanthroline-5,6-quinone about 50–150 mg. of 5,7-dichloro-8-hydroxyquinoline, about 10–40 mg. of dehydrocholic acid, about 30–70 mg. of bromelin and about 150–300 mg. of pancreatin in the form of a three-stage dragée the inside core of which contains the 4,7-phenanthroline-5,6-quinone and the 5,7-dichloro-8-hydroxyquinoline, the layer surrounding the core contains the pancreatin and the dehydrocholic acid, and the outer dragée layer contains the bromelin and dissolves in the gastric juice, whereas the entire dragée is protected by an envelope which is resistant to the gastric juice but disintegrates in an alkaline medium in such manner that the layer surrounding the core is liberated in the alkaline medium of the duodenum only and the inside core decomposes in the upper part of the small intestine.

2. A pharamaceutical preparation according to claim 1, which contains for every 10 mg. of 4,7-phenanthroline-5,6-quinone 100 mg. of 5,7-dichloro-8-hydroxyquinoline, 25 mg. of dehydrocholic acid, 50 mg. of bromelin, and 150 mg. of pancreatin.

3. A pharmaceutical preparation according to claim 1, which contains for every 10 mg. of 4,7-phenanthroline-5,6-quinone 70 mg. of 5,7-dichloro-8-hydroxyquinoline, 25 mg. of dehydrocholic acid, 50 mg. of bromelin and 220 mg. of pancreatin.

4. A pharamaceutical preparation containing for every 10 mg. of 4,7-phenanthroline-5,6-quinone about 70–130 mg. of 5,7-dichloro-8-hydroxyquinoline, about 20–30 mg. of dehydrocholic acid, about 40–60 mg. of bromelin and about 120–180 mg. of pancreatin in the form of a three-stage dragée the inside core of which contains the 4,7-phenanthroline-5,6-quinone and the 5,7-dichloro-8-hydroxyquinoline, the layer surrounding the core contains the pancreatin and the dehydrocholic acid, and the outer dragée layer contains the bromelin and dissolves in the gastric juice, whereas the entire dragée is protected by an envelope which is resistant to the gastric juice but disintegrates in an alkaline medium in such manner that the layer surrounding the core is liberated in the alkaline medium of the duodenum only and the inside core decomposes in the upper part of the small intestine.

References Cited

UNITED STATES PATENTS

| | | | |
|---|---|---|---|
| 2,928,770 | 3/1960 | Bardani | 424—21 |
| 2,991,226 | 7/1961 | Millar et al. | 424—21 |
| 3,021,216 | 2/1962 | Rosenthal | 424—258 |
| 3,178,343 | 4/1965 | Kradolfer | 424—258 |

OTHER REFERENCES

Modern Drug Encyclopedia, 9th edit. (1963), pp. 451 and 493, Reuben Donnelley Corp.

Hennrich et al.: Chem. Abst., vol. 63 (1965), p. 6184a.

Merck: Chem. Abst., vol. 64 (1966), p. 14038b.

SAM ROSEN, Primary Examiner

U.S. Cl. X.R.

424—94, 258